United States Patent
Convertini et al.

(10) Patent No.: US 12,326,112 B2
(45) Date of Patent: Jun. 10, 2025

(54) GAS TURBINE ENGINE BYPASS LOUVER AND BAFFLE RIB DESIGN

(71) Applicant: Pratt & Whitney Canada Corp., Longueuil (CA)

(72) Inventors: Marco P. Convertini, Vaughan (CA); Shervin Aslani Amoli, Toronto (CA); Harinath Bodugutla Venkata, Etobicoke (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/239,320

(22) Filed: Aug. 29, 2023

(65) Prior Publication Data

US 2025/0075657 A1     Mar. 6, 2025

(51) Int. Cl.
*F02C 7/04* (2006.01)
*F02C 9/18* (2006.01)

(52) U.S. Cl.
CPC .......... *F02C 7/04* (2013.01); *F02C 9/18* (2013.01); *F05D 2260/96* (2013.01)

(58) Field of Classification Search
CPC .... F02C 7/04; F02C 7/042; F02C 6/08; F02C 7/05; F02C 7/052; F02C 7/055
See application file for complete search history.

(56) References Cited

U.S. PATENT DOCUMENTS

| | | | |
|---|---|---|---|
| 5,809,772 A * | 9/1998 | Giffin, III | F02K 3/075 60/226.3 |
| 6,438,941 B1 * | 8/2002 | Elliott | F02C 9/18 60/785 |
| 10,280,872 B2 | 5/2019 | Rice | |
| 10,823,055 B2 | 11/2020 | Joshi et al. | |
| 11,702,995 B2 | 7/2023 | Capron et al. | |
| 2008/0115504 A1 * | 5/2008 | Martensson | F02C 9/18 60/785 |
| 2009/0165995 A1 * | 7/2009 | Bajusz | F28F 3/12 60/39.83 |

(Continued)

FOREIGN PATENT DOCUMENTS

EP     4043715 A2     8/2022

OTHER PUBLICATIONS

European Search Report for EP Application No. 24197382.5 dated Jan. 24, 2025.

*Primary Examiner* — Thuyhang N Nguyen
(74) *Attorney, Agent, or Firm* — Carlson, Gaskey & Olds, P.C.

(57) ABSTRACT

A gas turbine engine includes a fan operable for delivering air into a bypass duct. The fan is also operable for delivering air into a core engine housing. The core engine housing encloses a compressor, a combustor and a turbine section. The core engine housing has an upstream end defining a separation point between the bypass duct and the core engine housing. An air separation device is adjacent the upstream end. The air separation device includes a baffle and an opposed louver. The baffle and louver together are structured for defining an airflow path to guide air adjacent the upstream end with a radially outward and axially downstream components. There are baffle ribs on the baffle facing opposed louver ribs on the louver, with at least some of the louver ribs being circumferentially offset from the baffle ribs.

17 Claims, 4 Drawing Sheets

(56) References Cited

U.S. PATENT DOCUMENTS

| | | | |
|---|---|---|---|
| 2010/0180573 A1* | 7/2010 | Ruston | F02K 3/075 60/226.3 |
| 2020/0291868 A1 | 9/2020 | Kulkarni | |
| 2023/0073647 A1 | 3/2023 | Glessner et al. | |

\* cited by examiner

GAS TURBINE ENGINE BYPASS LOUVER AND BAFFLE RIB DESIGN

BACKGROUND

This application relates to a flow diverting louver and baffle with ribs for use in a gas turbine engine.

Gas turbine engines are known, and typically include a propulsor delivering air into a bypass duct, and into a core engine. The air in the core engine is compressed in a compressor, and delivered into a combustor. Fuel is mixed with the compressed air and it is ignited. Products of the combustion pass downstream over turbine rotors, driving them to rotate. The turbine motors in turn rotate the compressor and propulsor rotor.

The core engine is within a core engine housing. A splitter of the core engine housing is at the upstream end of the core engine, and serves to split the bypass duct from the core engine. There is an air diverter at the upstream end of the core housing, and having a louver and baffle. The purpose of the louver and baffle is to divert the air from the splitter radially outwardly and with an axially downstream component into the bypass duct flow.

SUMMARY

A gas turbine engine includes a fan operable for delivered air into a bypass duct as bypass air. The fan is also operable for delivering air into a core engine housing. The core engine housing encloses a compressor, a combustor and a turbine section. The core engine housing has an upstream end defining a separation point between the bypass duct and the core engine housing. An air separation device is adjacent the upstream end. The air separation device includes a baffle and an opposed louver. The baffle and louver together are structured for defining an airflow path to guide air adjacent the upstream end with a radially outward and axially downstream component. There are baffle ribs on the baffle facing opposed louver ribs on the louver, with at least some of the louver ribs being circumferentially offset from the baffle ribs.

These and other features will be best understood from the following drawings and specification, the following is a brief description.

DETAILED DESCRIPTION

Figure 1:
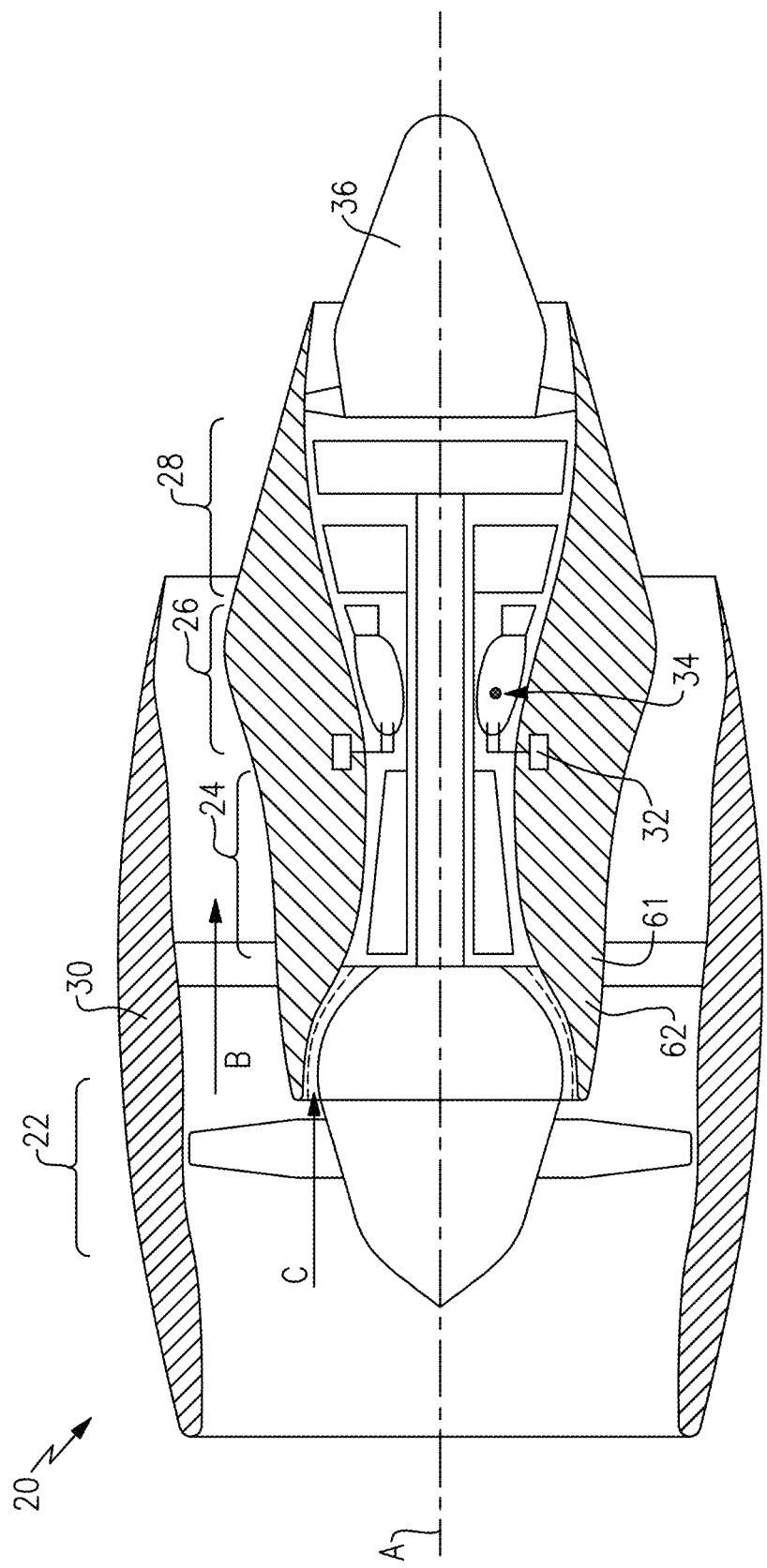
FIG. 1 schematically shows a gas turbine engine.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and ignited by igniter 34 to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller. This embodiment can also be applied to industrial gas turbine engine as well.

An engine housing 62 upstream most end is known as a splitter. This separates the bypass duct from the core engine. An airfoil diverter assembly is included to guide air into the bypass flow B.

Figure 2A:
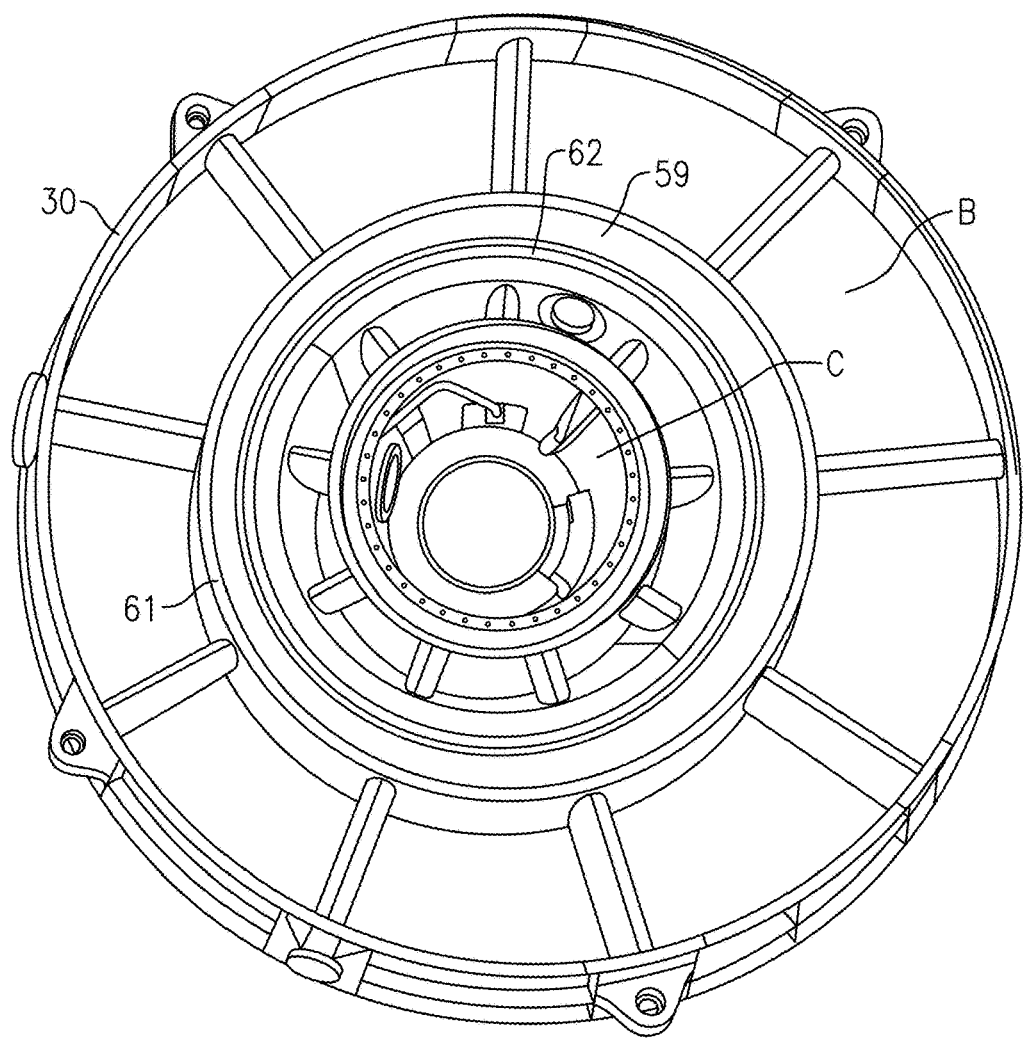
FIG. 2A is a front view looking into a gas turbine engine.
Figure 2B:
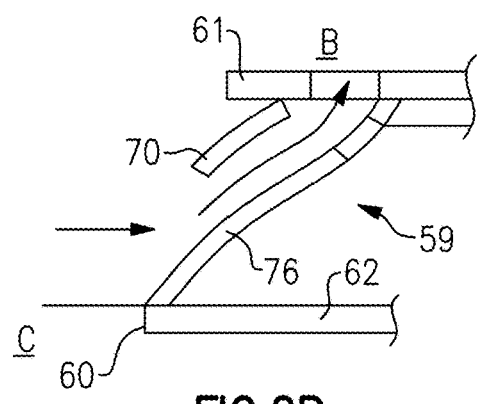
FIG. 2B schematically shows an air diverter associated with a gas turbine engine.

The airfoil diverter assembly 59 is better shown in FIGS. 2A and 2B. An outer housing 61 surrounds the flow diverter assembly 59.

As shown, the flow diverter assembly includes a baffle 76 and a louver 70. The baffle and louver are curved so as to guide air from the housing 62 with a radially outward and axially downstream component. The air will initially encounter the baffle 76 and be guided by ribs (disclosed below) radially outwardly and curving with a downstream axial component until it reaches the louver 70. Ribs on the louver 70 will assist in guiding the air in the desired direction such that it blends easily into the bypass airflow B.

Figure 3A:
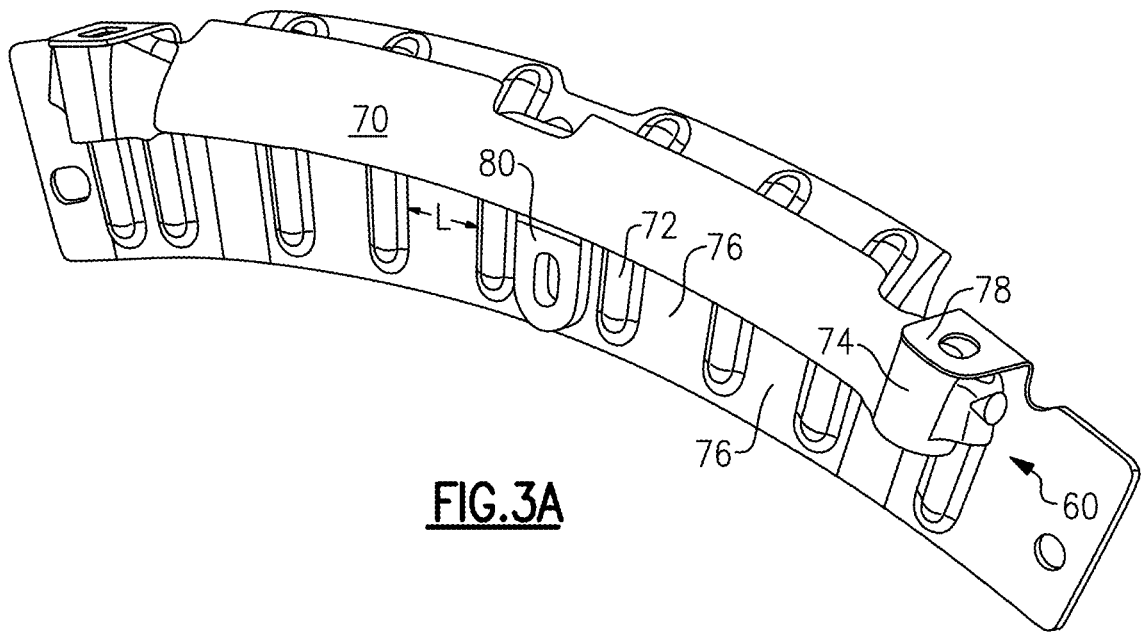
FIG. 3A shows a flow diverting baffle and louver combination.

The air diverter assembly 59 is illustrated in FIG. 3A with baffle 76 and louver 70. As shown, a boss 74 on the louver 70 is secured to bolt holding tabs 78 on the baffle. Similarly, a post 80 on the louver is secured to a mating post on the baffle 76. There are ribs 72 on the baffle that serve to guide the airflow as explained above. The ribs 72 are spaced by a distance L.

Figure 3B:
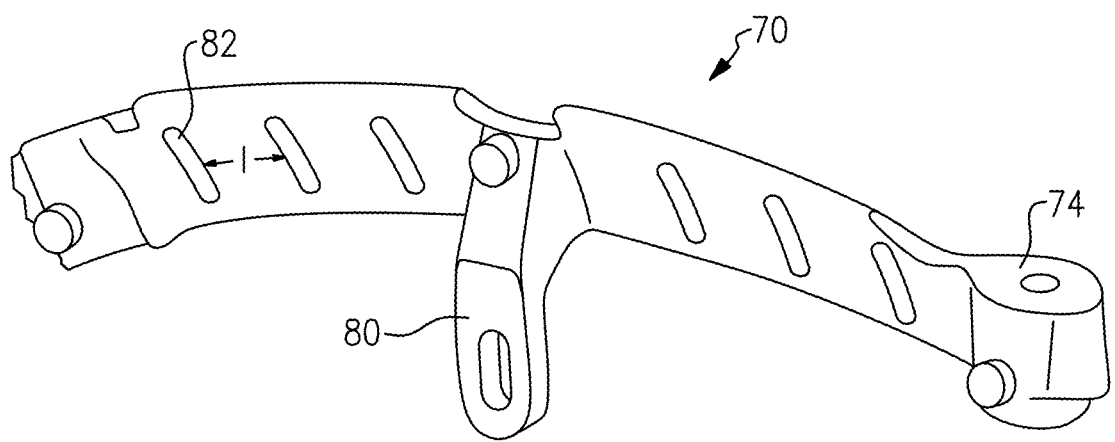
FIG. 3B is a view of the louver.

FIG. 3B shows detail of the louver 70 having the post 80 and its own ribs 82. Ribs 82 are spaced by a distance l.

Figure 3C:
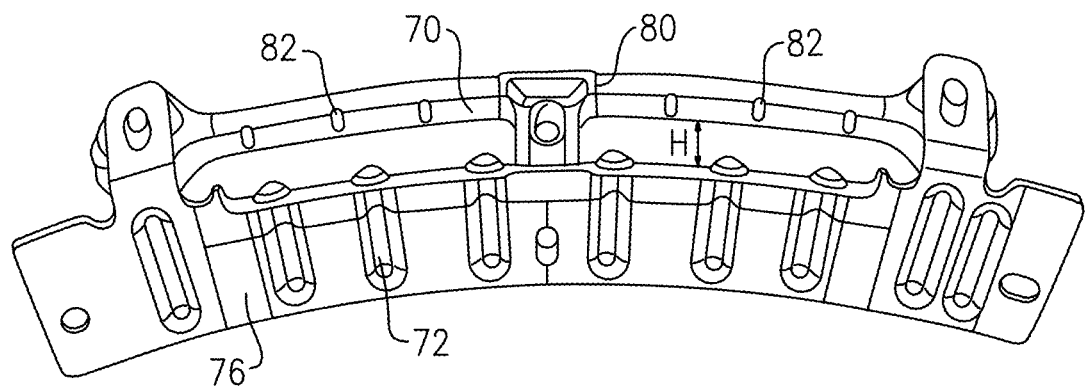
FIG. 3C shows the assembled baffle and louver.

FIG. 3C is a view from the rear of the baffle plate 76 showing the ribs 72, which are also on the forward face as is clear from FIG. 3A. However, one can also see that the louver 70 has ribs 82 facing the ribs 72 on the baffle plate 76. As shown, a height or distance of the airflow channel between an inner face of the louver 70 and the opposed face of the baffle 76 is defined as H.

Figure 3D:
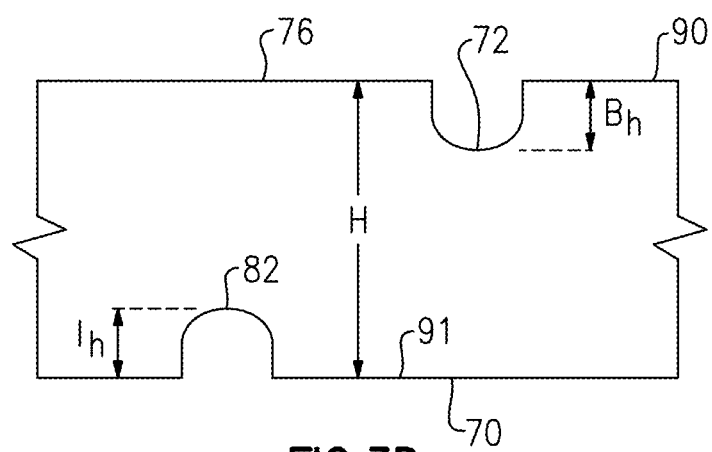
FIG. 3D schematically shows a feature relating to ribs on the baffle and louver.

As shown in FIG. 3D, the ribs 82 on the louver 70 extend away from a nominal face 91 by a distance lh. The distance H is also illustrated here. The ribs 72 on the baffle 76 extend away from the nominal face 90 by a distance of Bh.

In embodiments a ratio of Bh/H is greater than or equal to 0.1 and less than or equal to 0.75 in the embodiments. The ratio of lh/H is greater than or equal to 0.01 and less than or equal to 0.5.

Figure 4:
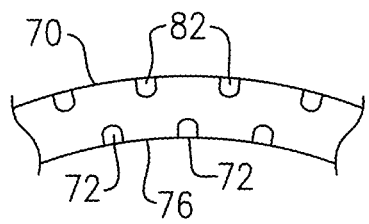
FIG. 4 schematically shows another feature with regard to the ribs.

The distances L and l are defined as shown in FIG. 4 to achieve a staggered or circumferentially offset relationship between the ribs 82 and 72. As is clear, the facing surfaces for the louver 70 and baffle plate 76 are curved, with ribs 72 and 82 extending from curved surfaces of both parts. That is, as illustrated, the ribs 72 are circumferentially offset from the ribs 82. The spacing L and l may be equal, or l may be greater than L, or L may be greater than l. In the end, it is desired to achieve the staggered relationship.

Applicant has found that this staggered relationship provides several benefits.

Ribs serve to direct and control airflow while also absorbing and distributing vibratory forces. The ribs effectively mitigate stress that is driven by airflow. By having the staggered ribs along the length of the baffle and louver, superior control of the airflow and vibratory stress reduction are achieved. The prior art has sometimes used ribs on the baffle, but there have not been staggered ribs on the two parts. An example of the prior art is illustrated in prior U.S. Pat. No. 11,702,995.

While the ribs are shown as a particular shape, other shapes such as elliptical, rectangular, triangular may be utilized.

A gas turbine engine under this disclosure could be said to include a fan 22 operable for delivering air into a bypass duct B. The fan is also operable for delivering air into a core engine housing 62. The core engine housing encloses a compressor 24, a combustor 34 and a turbine section 36. The core engine housing has an upstream end defining a separation point between the bypass duct and the core engine housing. An air separation device 59 includes a baffle 76 and an opposed louver 70. The baffle 76 and louver 70 together are structured for defining an airflow path to guide air adjacent with a radially outward and axially downstream components. There are baffle ribs 72 on the baffle 76 facing opposed louver ribs 82 on the louver 70, with at least some of the louver ribs 82 being circumferentially offset from the baffle ribs 72.

In another embodiment according to the previous embodiment, the baffle ribs 72 extend radially inward of the louver such that some airflow will initially encounter the baffle 70, and the ribs 72 for guiding the air into a flow channel defined between the baffle and the louver. The air will begin to encounter/interface the louver ribs and baffle ribs.

In another embodiment according to any of the previous embodiments, the louver is fixed to the baffle.

In another embodiment according to any of the previous embodiments, a passage height H of the flow channel between the louver and the baffle at a maximum distance is defined. There is a baffle rib height Bh of the baffle ribs on the baffle extending away from a nominal face of the baffle, with a ratio of the baffle rib height to the passage height being greater than or equal to 0.1 and less than or equal to 0.75.

In another embodiment according to any of the previous embodiments, there is a louver rib height lh of the louver ribs extending away from a nominal face and a ratio of the louver rib height to the passage height H being greater than or equal to 0.01 and less than or equal to 0.5.

In another embodiment according to any of the previous embodiments, there is a baffle rib distance L circumferentially between circumferentially adjacent baffle ribs and there is a louver rib distance i between circumferentially adjacent louver ribs and the baffle rib distance is equal to the louver rib distance.

In another embodiment according to any of the previous embodiments, there is a baffle rib distance L circumferentially baffle ribs on the baffle and there is a louver rib distance l between circumferentially adjacent louver ribs on the louver and the baffle rib distance being greater than the louver rib distance.

In another embodiment according to any of the previous embodiments, there is a baffle rib distance circumferentially between circumferentially adjacent baffle ribs on the baffle and there is a louver rib distance between circumferentially adjacent louver ribs on the louver and the louver rib distance being greater than the baffle rib distance.

In another embodiment according to any of the previous embodiments, the louver is fixed to the baffle.

In another embodiment according to any of the previous embodiments, a passage height of a flow channel between the louver and the baffle at its maximum distance is defined. There is a baffle rib height of the baffle ribs on the baffle extending away from a nominal face of the baffle, with a ratio of the baffle rib height to the passage height being greater than or equal to 0.1 and less than or equal to 0.75.

In another embodiment according to any of the previous embodiments, there is a louver rib height of the louver ribs extending away from a nominal face of the louver and a ratio of the louver ribs height to the passage height being greater than or equal to 0.01 and less than or equal to 0.5.

In another embodiment according to any of the previous embodiments, there is a baffle rib distance circumferentially between circumferentially adjacent baffle ribs one the baffle and there is a louver rib distance between circumferentially adjacent louver ribs on the louver and the baffle rib distance being equal to the louver rib distance.

In another embodiment according to any of the previous embodiments, there is a baffle rib distance circumferentially between circumferentially baffle ribs on the baffle and there is a louver rib distance between circumferentially adjacent ribs on the louver and the baffle rib distance being greater than the louver rib distance.

In another embodiment according to any of the previous embodiments, there is a baffle rib distance circumferentially between circumferentially adjacent baffle ribs on the baffle and there is a louver rib distance between circumferentially adjacent louver ribs on the louver and the louver rib distance being greater than the baffle rib distance.

In another embodiment according to any of the previous embodiments, a passage height of a flow channel between the louver and the baffle at a maximum distance is defined. There is a baffle rib height of the baffle ribs on the baffle extending away from a nominal face of the baffle, with a ratio of the baffle rib height to the passage height being greater than or equal to 0.1 and less than or equal to 0.75.

In another embodiment according to any of the previous embodiments, there is a louver rib height of the louver ribs extending away from a nominal face and a ratio of the louver ribs height to the passage height being greater than or equal to 0.01 and less than or equal to 0.5.

In another embodiment according to any of the previous embodiments, there is a passage height of a flow channel between the louver and the baffle at a maximum distance a louver rib height of the louver ribs extending away from a nominal face of the louver and a ratio of the louver ribs height to the passage height being greater than or equal to 0.01 and less than or equal to 0.5.

In another embodiment according to any of the previous embodiments, there is a baffle rib distance circumferentially between circumferentially adjacent baffle ribs and there is a louver rib distance between circumferentially adjacent louver ribs and the baffle rib distance being equal to the louver rib distance.

In another embodiment according to any of the previous embodiments, there is a baffle rib distance circumferentially between circumferentially baffle ribs and there is a louver rib distance between circumferentially adjacent louver ribs and the baffle rib distance being greater than the louver rib distance.

In another embodiment according to any of the previous embodiments, there is a baffle rib distance circumferentially between circumferentially adjacent baffle ribs and there is a louver rib distance between circumferentially adjacent louver ribs and the louver rib distance being greater than the baffle rib distance.

Although embodiments have been disclosed, a worker of skill in this art would recognize that modifications would come within the scope of this disclosure. For that reason, the following claims should be studied to determine the true scope and content.

What is claimed is:

1. A gas turbine engine comprising:
   a fan operable for delivering air into a bypass duct;
   the fan also operable for delivering air into a core engine housing, the core engine housing enclosing a compressor section, a combustor and a turbine section;
   the core engine housing having an upstream end defining a separation point between the bypass duct and the core engine housing;
   an air separation device including a baffle and an opposed louver, the baffle and louver curved for defining an airflow path to guide air with a radially outward and axially downstream components, there being baffle ribs on a curved surface of the baffle facing an opposed curved surface of the louver ribs on the louver, with at least some of the louver ribs being circumferentially offset from the baffle ribs; and
   wherein a passage height of the flow channel between the louver and the baffle at a maximum distance is defined, and there being a baffle rib height of the baffle ribs on the baffle extending away from a nominal face of the baffle, with a ratio of the baffle rib height to the passage height being greater than or equal to 0.1 and less than or equal to 0.75.

2. The gas turbine engine as set forth in claim 1, wherein the baffle ribs extend radially inward of the louver such that some airflow will initially encounter the baffle, and the baffle ribs for guiding the air into a flow channel defined between the baffle and the louver, wherein the air then begins to encounter the louver ribs and the baffle ribs.

3. The gas turbine engine as set forth in claim 2, wherein the louver is fixed to the baffle.

4. The gas turbine engine as set forth in claim 1, wherein the louver is fixed to the baffle.

5. The gas turbine engine as set forth in claim 4, wherein a passage height of a flow channel between the louver and the baffle at its maximum distance is defined, and there being a baffle rib height of the baffle ribs on the baffle extending away from a nominal face of the baffle, with a ratio of the baffle rib height to the passage height being greater than or equal to 0.1 and less than or equal to 0.75.

6. The gas turbine engine as set forth in claim 5, wherein there being a louver rib height of the louver ribs extending away from a nominal face of the louver and a ratio of the louver ribs height to the passage height being greater than or equal to 0.01 and less than or equal to 0.5.

7. The gas turbine engine as set forth in claim 6, where there being a baffle rib distance circumferentially between circumferentially adjacent baffle ribs on the baffle and there being a louver rib distance between circumferentially adjacent louver ribs on the louver and the baffle rib distance being equal to the louver rib distance.

8. The gas turbine engine as set forth in claim 6, where there being a baffle rib distance circumferentially between circumferentially baffle ribs on the baffle and there being a louver rib distance between circumferentially adjacent ribs on the louver and the baffle rib distance being greater than the louver rib distance.

9. The gas turbine engine as set forth in claim 6, where there being a baffle rib distance circumferentially between circumferentially adjacent baffle ribs on the baffle and there being a louver rib distance between circumferentially adjacent louver ribs on the louver and the louver rib distance being greater than the baffle rib distance.

10. The gas turbine engine as set forth in claim 1, wherein there being a passage height of a flow channel between the louver and the baffle at a maximum distance a louver rib height of the louver ribs extending away from a nominal face of the louver and a ratio of the louver ribs height to the passage height being greater than or equal to 0.01 and less than or equal to 0.5.

11. The gas turbine engine as set forth in claim 1, where there being a baffle rib distance circumferentially between circumferentially adjacent baffle ribs and there being a louver rib distance between circumferentially adjacent louver ribs and the baffle rib distance being equal to the louver rib distance.

12. The gas turbine engine as set forth in claim 1, where there being a baffle rib distance circumferentially between circumferentially baffle ribs and there being a louver rib distance between circumferentially adjacent louver ribs and the baffle rib distance being greater than the louver rib distance.

13. The gas turbine engine as set forth in claim 1, where there being a baffle rib distance circumferentially between circumferentially adjacent baffle ribs and there being a louver rib distance between circumferentially adjacent louver ribs and the louver rib distance being greater than the baffle rib distance.

14. The gas turbine engine as set forth in claim 1, wherein the circumferentially offset louver ribs and baffle ribs reduce vibratory stress.

15. A gas turbine engine comprising:
   a fan operable for delivering air into a bypass duct;
   the fan also operable for delivering air into a core engine housing, the core engine housing enclosing a compressor section, a combustor and a turbine section;
   the core engine housing having an upstream end defining a separation point between the bypass duct and the core engine housing;
   an air separation device including a baffle and an opposed louver, the baffle and louver curved for defining an airflow path to guide air with a radially outward and axially downstream components, there being baffle ribs on a curved surface of the baffle facing an opposed curved surface of the louver ribs on the louver, with at least some of the louver ribs being circumferentially offset from the baffle ribs; and
   wherein there being a louver rib height of the louver ribs extending away from a nominal face and a ratio of the louver ribs height to the passage height being greater than or equal to 0.01 and less than or equal to 0.5.

16. The gas turbine engine as set forth in claim 15, where there being a baffle rib distance circumferentially between circumferentially adjacent baffle ribs and there being a louver rib distance between circumferentially adjacent louver ribs and the baffle rib distance being equal to the louver rib distance.

17. A gas turbine engine comprising:
   a fan operable for delivering air into a bypass duct;
   the fan also operable for delivering air into a core engine housing, the core engine housing enclosing a compressor section, a combustor and a turbine section;

the core engine housing having an upstream end defining a separation point between the bypass duct and the core engine housing;

an air separation device including a baffle and an opposed louver, the baffle and louver together structured for defining an airflow path to guide air with a radially outward and axially downstream components, there being baffle ribs on a curved surface of the baffle facing an opposed curved surface of the louver ribs on the louver, with at least some of the louver ribs being circumferentially offset from the baffle ribs;

wherein a passage height of a flow channel between the louver and the baffle at a maximum distance is defined, and there being a baffle rib height of the baffle ribs on the baffle extending away from a nominal face of the baffle, with a ratio of the baffle rib height to the passage height being greater than or equal to 0.1 and less than or equal to 0.75; and wherein there being a louver rib height of the louver ribs extending away from a nominal face and a ratio of the louver ribs height to the passage height being greater than or equal to 0.01 and less than or equal to 0.5.

* * * * *